United States Patent [19]

Everts et al.

[11] 4,304,435
[45] Dec. 8, 1981

[54] MOTOR VEHICLE ROOF

[75] Inventors: Ramon L. Everts, Koln-Hahnwald; Hermann Friedl, Pulheim, both of Fed. Rep. of Germany

[73] Assignee: Ford Motor Company, Dearborn, Mich.

[21] Appl. No.: 103,883

[22] Filed: Dec. 17, 1979

[30] Foreign Application Priority Data

May 25, 1979 [DE] Fed. Rep. of Germany ....... 2916682

[51] Int. Cl.³ .............................................. E06B 7/16
[52] U.S. Cl. .................................................. 296/213
[58] Field of Search .......................... 296/213; 49/485

[56] References Cited

U.S. PATENT DOCUMENTS

| | | | |
|---|---|---|---|
| 3,550,950 | 12/1970 | Pollock | 296/213 |
| 3,596,980 | 8/1971 | Carson | 296/154 |
| 3,711,147 | 1/1973 | Higuchi et al. | 296/213 X |
| 3,892,439 | 7/1975 | Lotz | 296/213 |
| 3,927,493 | 12/1973 | Tsuneishi et al. | 49/485 X |
| 4,118,063 | 10/1978 | Bienert et al. | 296/213 |

Primary Examiner—Joseph F. Peters, Jr.
Assistant Examiner—Norman L. Stack, Jr.
Attorney, Agent, or Firm—John J. Roethel; Clifford L. Sadler

[57] ABSTRACT

A motor vehicle roof of the roof panel of which the side wall panels are attached forming a roof frame and roof pillars. The connecting region between the roof panel and the side wall panels is recessed and is covered by a profile strip made of elastic material assuming masking, sealing, gutter and styling functions.

6 Claims, 10 Drawing Figures

MOTOR VEHICLE ROOF

BACKGROUND OF THE INVENTION

A motor vehicle roof in which gutters extending at the sides are constituted by a profile strip made of elastic material covering a recessed connecting flange is already known from German patent publication DE-OS No. 19 51 683.

The known motor vehicle roof with the profile strip assuming masking, sealing, gutter and styling functions exhibits the disadvantage that it exhibits too small a cross-section for reliable water drainage, and furthermore, does not take into consideration the water drainage from the region of the windscreen and the rear window of the motor vehicle.

It is the aim of the invention to improve a motor vehicle roof of the type initially defined so that the profile strip used exhibits firstly an adequate cross-section for reliable water drainage and secondly, in unmodified construction, also provides for the water drainage in the region of the windscreen and rear window of the motor vehicle.

SUMMARY OF THE INVENTION

The invention relates to a motor vehicle roof to the roof panel of which the side wall panels are attached forming a roof frame and roof pillars. The connection between the roof panel and the side wall panels is recessed and is covered by a profile strip made of elastic material assuming masking, sealing, gutter and styling functions.

The recessed region is constructed as a step declining towards a door closure or opening, which step in the case of a four-door motor vehicle body extends continuously and uniformly from the forwardmost or A-pillar across the roof frame to the rearwardmost or C-pillar and accommodates an elastic profile strip anchored by adhesive or mechanical fasteners. The strip is relatively wide and constitutes a first gutter by a first longitudinal groove and a second gutter by a second longitudinal groove. It carries a styling strip or the like on a bridge formed between the two grooves. The side wall of the second groove located towards the door or closure opening forms a sealing lip cooperating with the door or closure flange. This produces a motor vehicle roof for a motor car wherein a reliable water drainage from the roof region and also from the windscreen region is provided with a stylistically satisfactorily placed profile strip.

In the case of a two-door motor vehicle body, the recessed region in the form of a step declining towards the door opening extends above the stationary side window as a trough shaped indentation to the C-pillar and transversely across the rear roof frame. A water drainage in the rear window region thus is achieved additionally to the water drainage from the roof region and from the windscreen region.

Due to the fact that the recessed region in the form of a step declining towards the door or closure opening in the case of an estate car or fastback shape of a motor vehicle body extends continuously from the rearmost or D-pillar of the one side transversely across the rear roof frame to the D-pillar of the other side, a reliable water drainage in the region of the rear window which is particularly necessary with these body shapes is ensured.

Due to the fact that the recessed region in the form of a step declining towards the door apertures extends, in the case of a four-door motor vehicle body, above the stationary rear window as a trough shaped indentation transversely across the rear roof frame, a drainage of water from the region of the rear window can optionally be ensured also in the case of this body shape.

The relatively great width of the elastic profile strip with the parallel oriented gutters formed by the two longitudinal grooves permits an adequate water drainage without the thickness of the profile strip having to be chosen too large for this purpose. The flat, wide shape of the profile strip in conjunction with the styling strip affixed to the bridge makes it possible to place the functional profile strip in such a way that it appears substantially as a stylistically conforming element on the motor vehicle body.

DESCRIPTION OF THE DRAWINGS

The invention is explained more fully with reference to an examplary embodiment illustrated in the accompanying drawings, wherein.

DETAILED DESCRIPTION OF THE INVENTION

Figure 1:
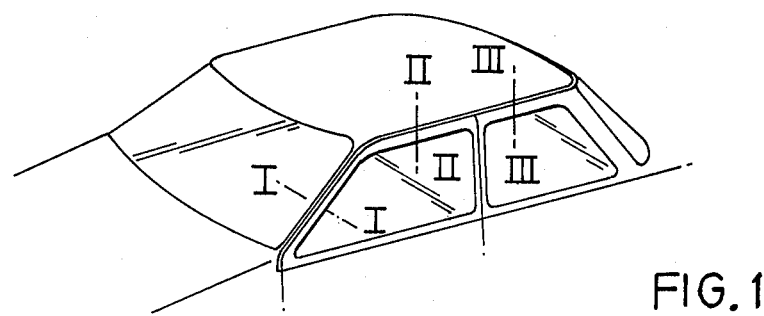
FIG. 1 shows a schematic view of a two-door motor vehicle body.

The motor vehicle roof, more particularly for motor cars, shown in the figures substantially comprises a roof panel 1 which is connected to an inner side wall panel 2 and an outer side wall panel 3 forming a roof frame and roof columns. The connecting region 4 between the roof panel 1 and the side wall panels 2 and 3 is recessed and constructed as a step 5 declining towards the door or closure opening.

A profile strip 6 made of elastic material and assuming masking, sealing, gutter and styling functions is arranged in the region of the step 5.

The elastic profile strip 6 exhibits a comparatively flat and wide cross-section and forms a first gutter by a first longitudinal groove 7, and second gutter by a second longitudinal groove 8, of which the side wall located towards the door or closure apertures constitutes a sealing lip 9 for the door or closure leaves. The profile strip 6 is provided with a styling strip 11 on its bridge 10 extending between the two longitudinal grooves 7 and 8.

The profile strip 6 may be attached to the step 5 in the region of the A-pillar by gluing. In the region of the roof frame, the profile strip 6 may be firmly clamped to flanges formed in the connecting region 4 or anchored to welded bolts placed in that region.

Figure 2:
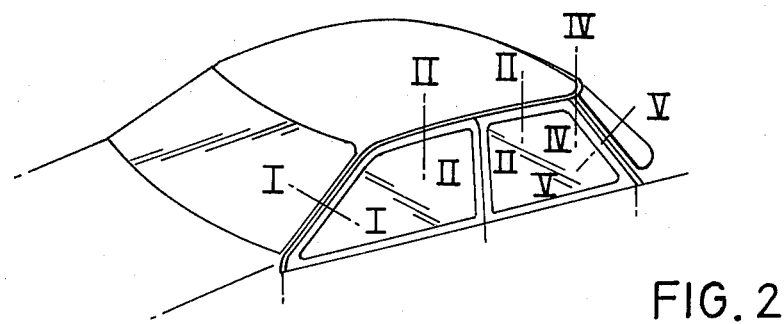
FIG. 2 shows a schematic view of a four-door motor vehicle body.
Figure 4:
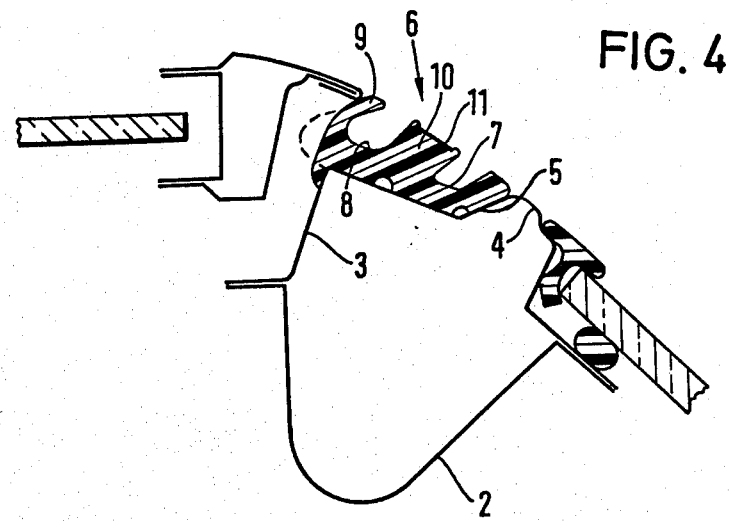
FIG. 4 shows a section indicated at I—I in FIGS. 1, 2 and 3 through the A-pillar of a motor vehicle.
Figure 5:
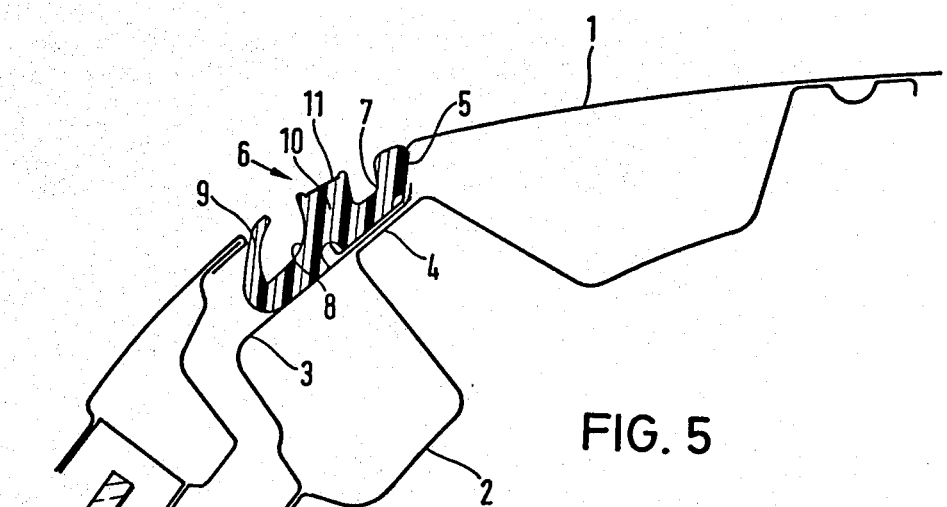
FIG. 5 shows a section indicated at II—II in FIGS. 1, 2 and 3 through the roof frame in the region of a motor vehicle door.
Figure 8:
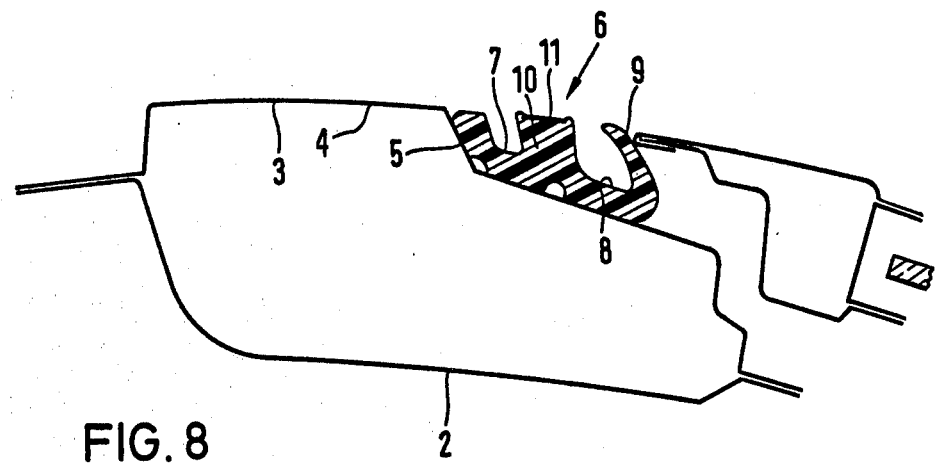
FIG. 8 shows a section indicated at V—V in FIG. 2 through the C-pillar.

In the case of a four-door motor vehicle body shown in FIG. 2, the profile strip 6 extends continuously and uniformly from the foot or base of the A-pillar across the lateral roof frame to the foot or base of the C-pillar. In this case, the profile strip 6 exhibits a constant cross-section along its total length, as may be seen from FIGS. 4, 5 and 8.

Figure 6:
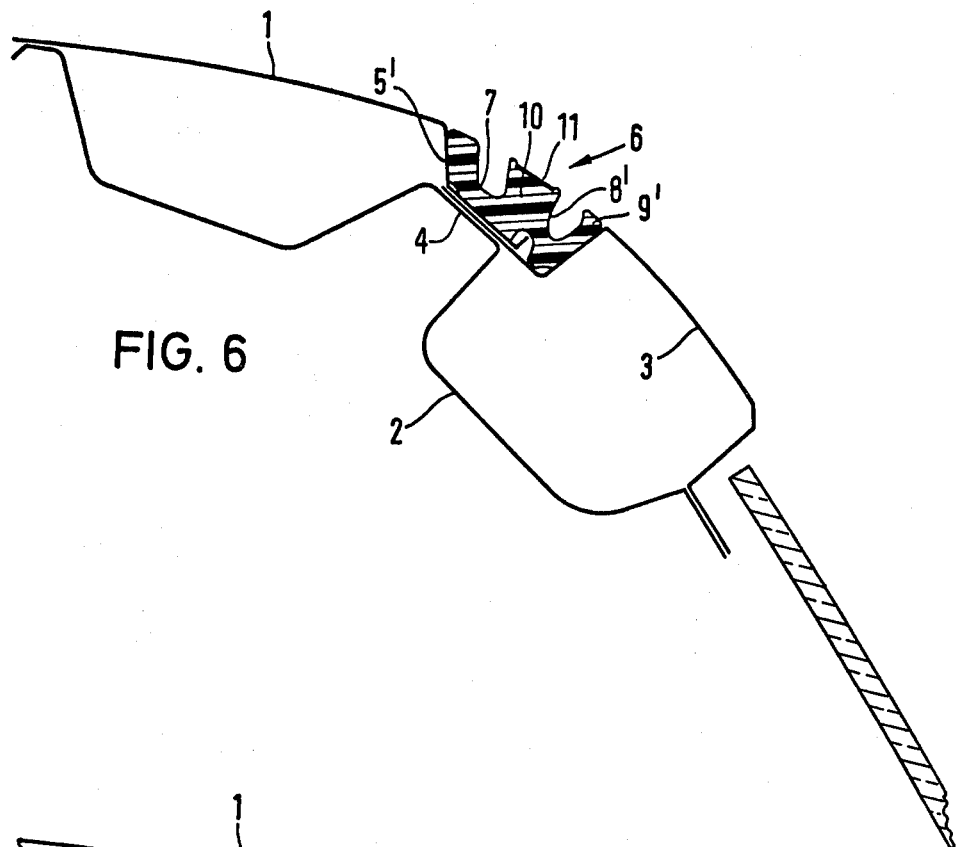
FIG. 6 shows a section indicated at III—III in FIGS. 1 and 3 through the roof frame in the region of a fixed installed side window.
Figure 7:
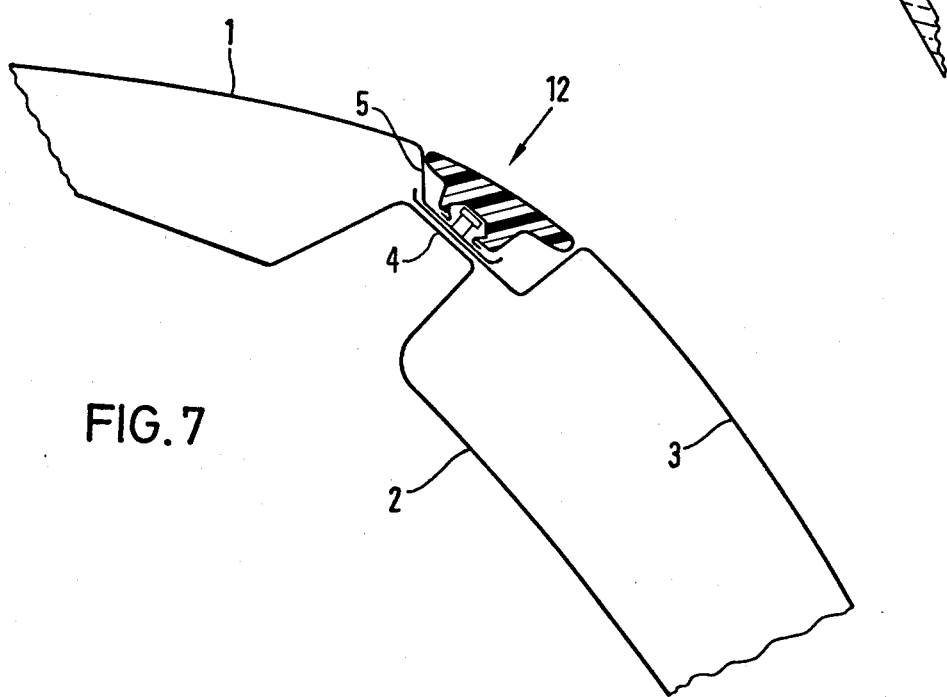
FIG. 7 shows a section indicated at IV—IV in FIG. 2 through the corner region of the C-pillar.

In the case of a two-door motor vehicle body shown in FIG. 7, the profile strip 12 extends from the foot of the A-pillar across the lateral roof frame to the head of the C-pillar and from there optionally transversely across the rear roof frame. The profile strip 12 in this case exhibits in the region of the door opening a constant cross-section which is slightly modified in the region of the fixed installed side window and optionally of the rear window in the manner to be seen from FIG. 6.

Figure 3:
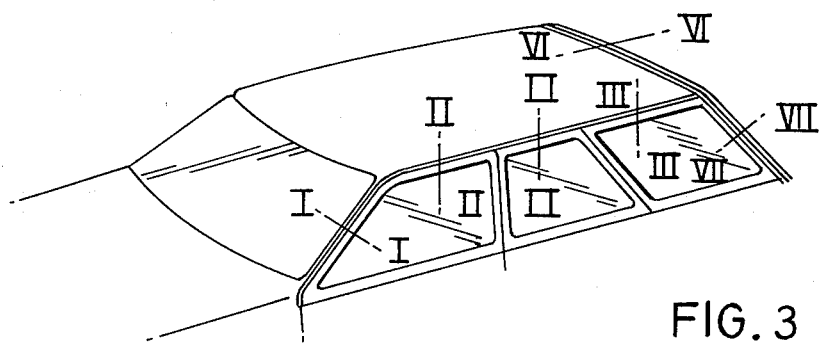
FIG. 3 shows a schematic view of an estate car or fastback shape of a motor vehicle body.
Figure 9:
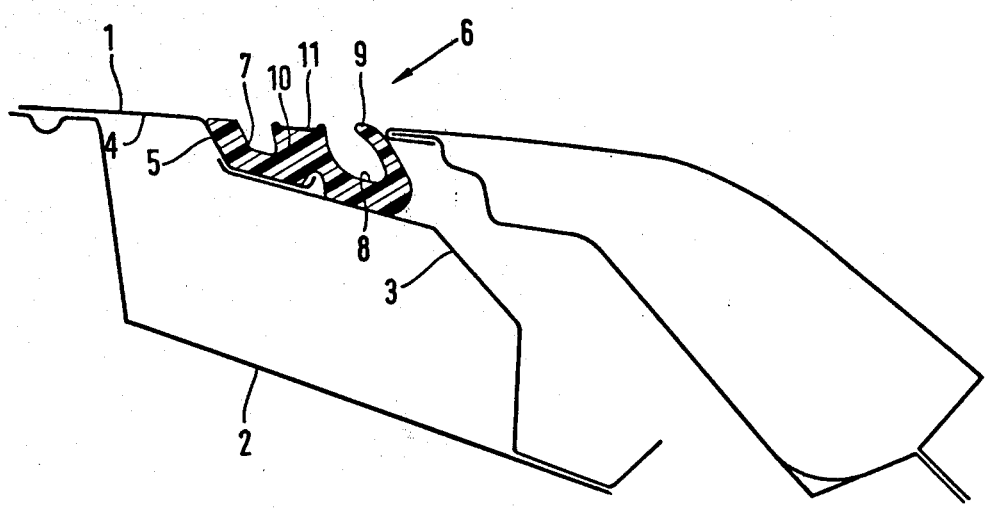
FIG. 9 shows a section indicated at VI—VI in FIG. 3 through the rear roof transverse beam in the region of the rear flap.
Figure 10:
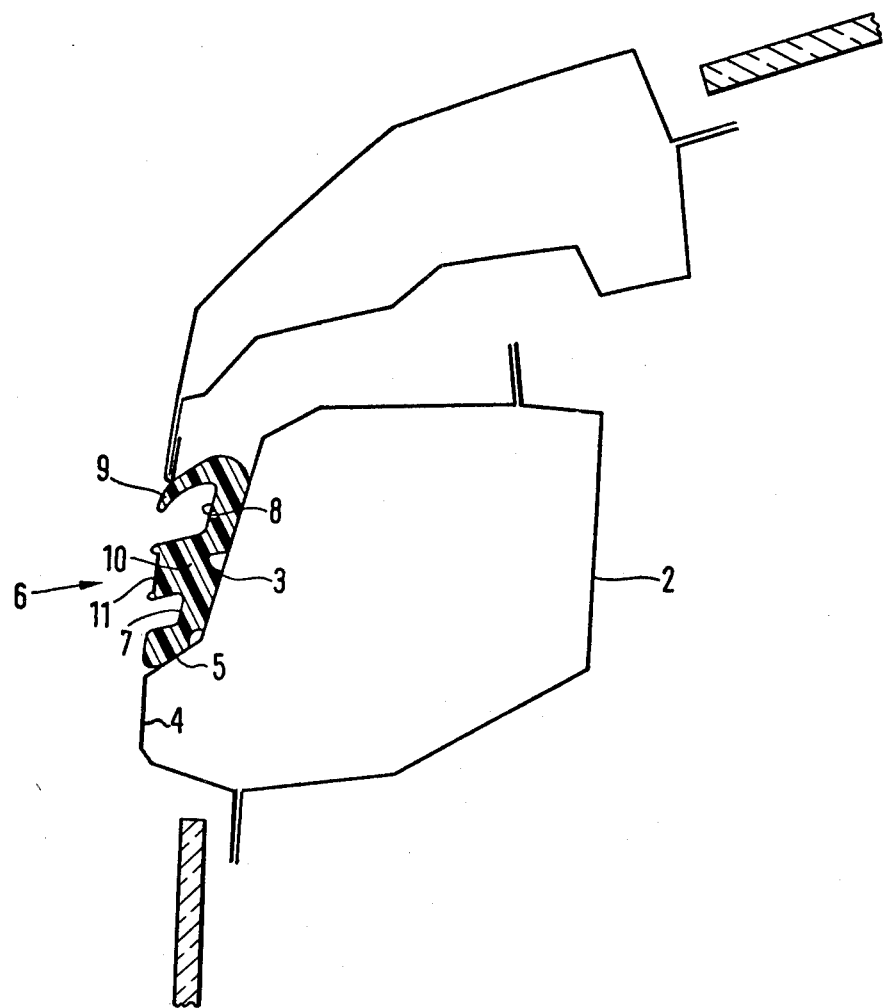
FIG. 10 shows a section indicated at VII—VII in FIG. 3 through the D-pillar of a motor vehicle.

In the case of an estate car or fastback shape of a motor vehicle body shown in FIG. 3, the profile strip 6 extends from the foot of the A-pillar across the lateral roof frame to the head of the D-pillar where it may abut with an identical profile strip 6 which extends from the foot of the D-pillar of one side upwards across the rear roof transverse beam to the foot of the D-pillar of the other side. The profile strip 6 exhibits in the region of the door apertures the cross-section to be seen from FIG. 4 and FIG. 5, whereas in the region of the rear fixed installed side window, it again exhibits the somewhat modified cross-section according to FIG. 6. In the region of the flap aperture, the profile strip 6 again exhibits the original cross-section as in the region of the door apertures, as may be seen from FIGS. 9 and 10.

Due to the construction of the recessed region as a step declining towards the door or closure openings according to the invention, and the arrangement of the flat, relatively wide, elastic profile strip in its particular profiling, the advantage is achieved that it can be arranged with substantially constant cross-section both on the roof columns or pillars and on the roof frame so that it can perform its gutter function, particularly in the region of the windscreen and of the rear window of a motor vehicle in a convenient manner. Due to the fact that the one side wall of the second longitudinal groove forms a sealing lip for the door or closure flange, an aerodynamically favorable, smooth surfaced transition is achieved in the gap region between the roof and the doors or closures. Due to the comparatively flat gutter grooves, the development of wind noise is avoided and adequate water drainage is ensured by the arrangement of two parallel oriented gutter grooves.

It is to be understood that this invention is not limited to the exact construction illustrated and described above, but that various changes and modifications may be made without departing from the spirit and scope of the invention as defined in the appended claims.

We claim:

1. A motor vehicle body having a roof panel supported on side wall panels forming a roof frame and roof pillars, the connecting region between the roof panel and the side wall panels being recessed and covered by a profile strip made of elastic material that assumes masking, sealing, gutter and styling functions, wherein the improvement comprises:
    the recessed connecting region being constructed as a step declining towards a body opening such as a door opening,
    the step extending continuously and uniformly from the base of the forwardmost body pillar across the roof frame toward the rear of the vehicle body,
    an elastic profile strip anchored in place in the step adhesively or by mechanical fasteners,
    the profile strip having substantial width and having a first longitudinal groove forming a first gutter and a second longitudinal groove forming a second gutter,
    a bridge formed between the first and second grooves having an ornamental surface thereon,
    the side wall of the second groove located towards the door opening being formed of a sealing lip engageable by a flange on a vehicle door for sealing any gap between the latter and the vehicle body.

2. A motor vehicle body according to claim 1, in which:
    in the case of a four-door motor vehicle the recessed connecting region extends continuously and uniformly from the base of the forwardmost body pillar toward the rear of the body beyond the door openings to the base of the rearmost body pillar.

3. A motor vehicle body according to claim 1, in which:
    in the case of a two-door motor vehicle body having a side window rearwardly of a door the recessed connecting region extends in the form of the step declining in the region above the stationary side window as a trough shaped indentation towards the top of the rearmost pillar.

4. A motor vehicle body according to claim 3, in which:
    the recessed connecting region continues uniformly from the top of the rearmost pillar on one side of the vehicle body transversely across the roof rear frame to the other side of the vehicle body.

5. A motor vehicle body according to claim 1, in which:
    in the case of a station wagon or fastback shape of a motor vehicle body the recessed connecting region extends in the form of a step declining towards the door opening continuously and uniformly from the foot of the rearmost column of the one side across the roof rear frame to the foot of the rearmost column of the other side.

6. A motor vehicle body according to claim 1 or 2, in which:
    in the case of a four-door motor vehicle body the recessed connecting region extends in the form of a step declining towards the door openings additionally above the stationary rear window transversely across the roof rear frame as a trough shaped indentation.

* * * * *